TRANSFORMER COUPLED CATHODE FOLLOWER

Filed March 16, 1954

*INVENTORS*
ROBERT C. KUENSTNER
DAVID J. CRAWFORD

*BY* Ralph C. Dustin

United States Patent Office 2,841,706

Patented July 1, 1958

2,841,706

TRANSFORMER COUPLED CATHODE FOLLOWER

Robert C. Kuenstner and David J. Crawford, Poughkeepsie, N. Y., assignors to International Business Machines Corporation, New York, N. Y., a corporation of New York Application March 16, 1954, Serial No. 416,572

6 Claims. (Cl. 250—27)

The present invention relates to an electronic circuit, and more particularly to an electronic circuit of the cathode-follower type which is adapted to be connected to a capacitive load.

The conventional cathode follower circuit has a high input and a low output impedance, and is widely employed to couple an input signal to an output load without polarity inversion and with minimum distortion. The behavior of cathode follower circuits as impedance matching devices is well known with respect to their operation with either sinusoidal or periodic rectangular wave input signals, and considerable information is available with respect to such operation. However, when a cathode-follower circuit is employed to couple signals having a rectangular waveform to a capacitive load, distortion is introduced into the output waveform, such distortion being principally in the form of delayed fall time caused by the exponential discharge of the load. Other factors contributing to this distortion are the repetition rate of the input signal, the tube characteristics, the magnitude of the cathode resistance and the capacitance in the load. This delay in fall time is undesirable in that it produces the following disadvantages:

(1) It limits the repetition rate at which the cathode follower will deliver satisfactory performance.

(2) It produces a distorted output waveform resulting from the greater pulse width in the output signal.

(3) It results in a loss of pulse power at the higher repetition rate.

The formula for the discharge time constant of a capacity loaded cathode-follower is $T=RC$, where T is the discharge time, R is the cathode resistance and C the capacitance of the load. This formula is true only under the condition where the cathode cannot follow the rapidly decreasing input signal appearing on the grid, as for example, under the negative step function of the input waveform. Under this condition, the discharge time of the load varies directly as the value of the cathode resistance and load capacitance. The value of the capacitive load should be held to a minimum but will largely be governed by the load requirements of the particular application. The cathode resistance has a practical minimum value dictated by the current capacity of the tube. From the above, it can be seen that the fall time of the output waveform of the conventional capacity loaded cathode follower is dictated by practical circuit requirements and the amount of control which can be exercised over such fall time through component variation is extremely limited.

One of the objects of the present invention, therefore, is to provide an improved electronic circuit of the cathode follower type including a coupling circuit which produces a substantial reduction in the fall time of the output signal when the cathode follower circuit is connected to a capacitive load.

Another object of the present invention is to provide an improved electronic circuit of the cathode follower type which further incorporates transformer-coupling between the anode and cathode circuits thereof, this coupling serving to charge and discharge a capacitive load connected to said cathode followers circuit more rapidly, resulting in a decreased rise and fall time of the output signal.

A further object of the present invention is to provide an improved electronic circuit of the cathode follower type which further includes the combination of a transformer coupling circuit and a unidirectional low impedance by-pass circuit, which functions to substantially reduce the distortion in the output signal when said cathode follower circuit is connected to a capacitive load.

Still another object of the invention is to provide an improved electronic circuit of the cathode follower type having transformer-coupling between anode and cathode circuits and a diode by-pass circuit to provide rapid discharge of a capacitive load connected to said cathode follower circuit, resulting in a reduced fall time of the output waveform.

Other objects of the invention will be pointed out in the following description and claims and illustrated in the accompanying drawings which disclose, by way of examples, the principles of the invention and the best mode, which has been contemplated of applying that principle.

Figure 1:
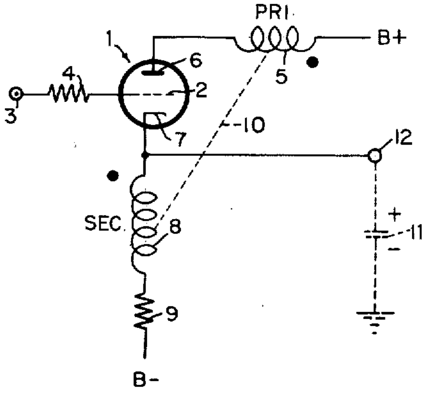
Fig. 1 illustrates in schematic form an electronic circuit of the cathode follower-type including a transformer-coupling arrangement between the anode and cathode circuits thereof.

Referring to the drawings and more particularly to Fig. 1 thereof, there is illustrated a vacuum tube 1 having a control grid 2 to which a square wave input signal may be applied through an input terminal 3 and a resistor 4. Assuming a rising condition of the input signal, current flows from the positive potential source B+ through transformer primary winding 5, through plate to to cathode 7, thence through transformer secondary winding 8 and cathode resistor 9 to a negative potential source B—. The mutual coupling between transformer primary winding 5 and secondary winding 8 is indicated by dotted line 10. This current flow causes the potential on one end of both primary winding 5 and secondary winding 8 to become positive with respect to the other end of said windings. Transformer windings 5 and 8 are so connected that an increase of current produces a change in voltage in the primary winding 5 which is coupled to secondary winding 8 in phase with the signal at the secondary, thereby reinforcing and increasing the amplitude of the signal at cathode 7. The resultant current causes the capacitive load 11, shown between output terminal 12 and ground, to charge more rapidly, thereby decreasing the rise time of the output signal.

As the input step function reaches its trailing edge and drops in a negative direction, the plate current initially decreases, resulting in a relative reversal of polarity of the signal in both the primary and secondary transformer windings. As the input signal drops further negative, the tube cuts off, whereupon, the capacitive load discharges, This discharge is not instantaneous but exponential in the manner of the conventional RC circuit. The discharge is aided by the transformer plate to cathode coupling, which reinforces the potential appearing at the upper end of secondary winding 8, causing the cathode to become more negative with respect to the oppositely charged capacitive load. The discharge path for the load is through the transformer secondary 8 and thence through the cathode resistor 9. The more rapid discharge of the load produced by this circuit results in a decreased fall time, as shown in the output waveform illustrated in Fig. 4(*c*).

Figure 2:
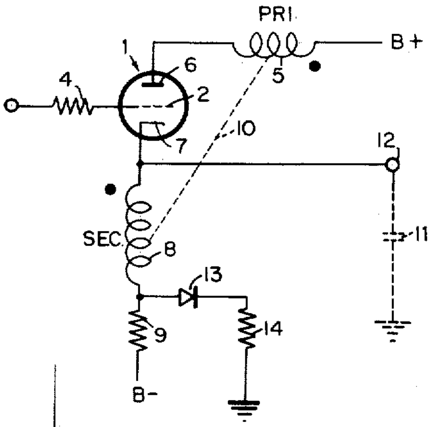
Fig. 2 illustrates in schematic form another embodiment of this invention which further includes a unidirectional by-pass circuit serving to provide a low impedance discharge path for the capacitive load.

While improved results are obtained from the aforesaid circuit arrangement, the circuit response will be further improved by use of the circuit illustrated in Fig. 2.

Fig. 2 is generally similar to Fig. 1 and further illustrates a unidirectional by-pass circuit consisting of diode 13 and impedance 14, said circuit used to by-pass cathode resistor 9. By means of this low impedance by-pass circuit, the overall circuit performance is improved. Resistor 14 has a relatively low value with respect to cathode resistor 9, in the order of magnitude of approximately one to twenty. With a cathode resistance value of 18,000 ohms, for example, resistor 14 may be 900 ohms.

Figure 4:
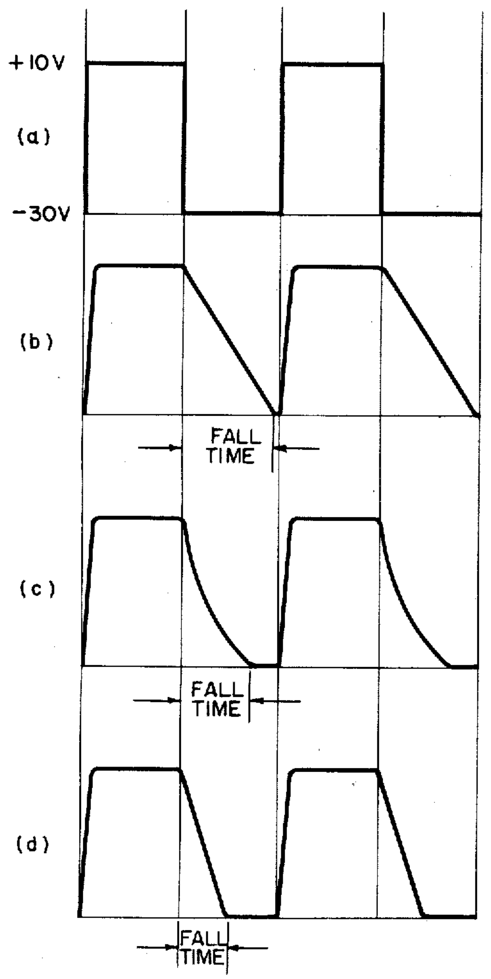
Fig. 4 illustrates a family of curves identifying the square wave step function input signal, the output of a conventional cathode follower, and waveforms at various points throughout the circuits of Figs. 1, 2 and 3.

The operation of the circuit embodiment illustrated in Fig. 2 is basically similar to that of Fig. 1 previously described. Under a rising waveform, the capacitive load 11 charges and the by-pass circuit has relatively no effect under the charging condition. The main function of the diode by-pass circuit is to provide a low impedance discharge path for the capacitive load, thereby aiding in decreasing the fall time of the output signal. As the input waveform swings in a negative direction, the capacitive load discharges in the manner described with reference to Fig. 1. The discharge path for the load is through transformer secondary winding 8, diode 13 and resistor 14 to ground. Since the resistance of the aforesaid diode by-pass circuit is low in comparison with that of cathode resistor 9, the capacitive load is enabled to discharge at a more rapid rate thereby further decreasing the fall time as illustrated in Fig. 4(*d*). This decrease in fall time is in the order of 50%, as compared to the fall time of a conventional cathode follower.

Figure 3:
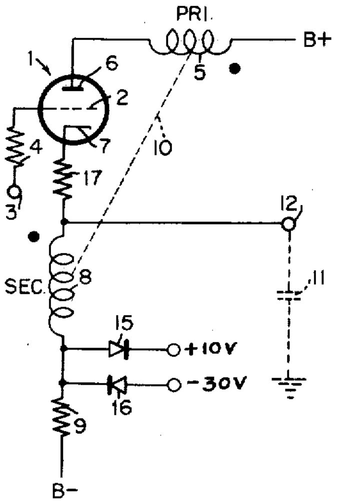
Fig. 3 illustrates in schematic form a still further embodiment of the transformer-coupled cathode follower type circuit which further includes a clamping means whereby the output signal is maintained within predetermined potential levels.

Should it be desirable to employ a tube having a relatively low plate dissipation characteristic, and further to maintain the output signal within predetermined amplitude limits dictated by the logical requirements of the load circuit, a circuit such as that illustrated in Fig. 3 may be employed.

The circuit illustrated in Fig. 3 is basically similar to the circuit shown in Fig. 1 but further illustrates the utilization of two oppositely poled diodes 15 and 16 connected to the cathode at the junction of cathode resistor 9 and transformer secondary winding 8. The cathode of diode 15 is connected to a voltage equal to the desired upper level of the output signal, for example, +10 volts, while the anode of diode 16 is connected to the desired lower level of the output signal, for example, −30 volts. Since the output voltage appearing across a cathode impedance "follows" closely the change of potential on the grid in a cathode follower circuit, if the input goes considerably positive, then the output will go considerably positive also. If the input signal exceeds +10 volts or if the lower end of transformer secondary 8 is forced above +10 volts during the fall period of the input waveform, the anode of diode 15 becomes positive with respect to the cathode and diode 15 conducts. As the input waveform swings negative and the capacitive load is forced to discharge, most of the discharge current flow is shunted through the unidirectional low impedance path of diode 15 rather than through the higher resistance path of cathode resistor 9. Hence the circuit operation is essentially the same as that of Fig. 2, producing an equally rapid discharge of the capacitive load through the low impedance diode path. The output waveform of this circuit is illustrated in Fig. 4(*d*). The embodiment illustrated in Fig. 3 further maintains the upper output signal level at +10 volts.

Diode 16, oppositely poled with respect to diode 15, serves a dual function, operating as a protective device for diode 15 and as a clipping diode for maintaining a predetermined minimum level for the output signal. With reference to the latter function, under the rise condition of the input signal the lower end of transformer secondary winding 8 is negative. If this negative value should fall below −30 volts, diode 16 conducts so that the lower signal amplitude is effectively "anchored" at this level.

From the above description, it may be observed that diodes 15 and 16 serve as clipping circuits for the output signal. The two voltage levels of the associated diodes establish two firm levels for the alternating peaking voltage of the transformer secondary to "push" against. On a rise condition of the input signal, the lower end of the secondary is negative and is "anchored" by the −30 volt diode, while on a fall condition, the lower end of the secondary now becomes positive and is "anchored" by the +10 volt diode.

The other function performed by diode 16 is to serve as a protective device for diode 15. Such protection is required because the characteristics of germanium diodes are such that if an excessive voltage in the back direction is applied across one of said diodes, the diode deteriorates. Repetition of a high back voltage pulse or a continuous high back voltage will eventually ruin the diode. If the back voltage is high enough, the diode will be ruined the first time such a back voltage is applied. With respect to Fig. 3, if the tube is removed from its socket, the tube heater opens or the plate supply disappears for one reason or another, the output voltage may attempt to become very negative and thus impose a high back voltage across diode 15 in excess of its rated voltage, which rated voltage may be, for example, 50 volts. As shown in Fig. 3, the back voltage appearing across the series circuit of cathode resistor 9 and diode 15 would be the absolute sum of the negative supply potential B− and the upper signal level connected to the cathode of diode 15. Assuming a nominal negative supply voltage of −150 volts and an upper signal of +10 volts, the absolute voltage appearing across the series connected circuit would be 160 volts. To determine the voltage appearing across each component, this circuit could be regarded as a voltage divider comprising cathode resistor 9 and the back resistance of diode 15, said circuit being connected across 160 volts. A diode may have a minimum back resistance of 50,000 ohms. The cathode resistor, as already noted, may be 18,000 ohms. Under the best possible condition, therefore, diode 15 would then have a minimum back voltage of approximately 118 volts. If the back resistance of diode 15 should have a higher value, a proportionately higher back voltage would be developed across it. However, by means of diode 16, if the voltage at the junction of the diodes and the cathode should drop below −30 volts, diode 16 conducts. Thus, the maximum back voltage which can be developed across diode 15 is limited to an absolute value of 40 volts, which would be well within the assumed 50 volt back voltage rating of the diode.

Under normal operating conditions, assuming a maximum input signal of +10 volts, for example, the signal level at the cathode might exceed this level, and may be for example, +12 volts. This condition causes D. C. current to flow through diode 15 which, combined with the normal tube current, might overrate the tube. To prevent such an occurrence, a bias resistor such as resistor 17 in Fig. 3 may be inserted in the cathode circuit. This resistor should be of such a valve as to make the upper output signal level of the cathode follower equal to the upper input signal level, and may be, for example, 75 ohms.

Referring to Fig. 4, the four curves *a*, *b*, *c* and *d* thereof, illustrate the waveforms of the output signals of a conventional capacity loaded cathode follower as well as those of the specific embodiments illustrated in Figs. 1, 2 and 3, utilizing a square wave or step function input signal as illustrated in curve *a*.

Curve *b* of Fig. 4 illustrates the waveform of the output signal of a conventional capacity loaded cathode follower. At a particular repetition rate, it can be seen that the fall time of the output waveform is appreciably long due to the discharge time of the capacitive load. From this it readily follows that if the repetition rate should be increased, the circuit would not have time to fully discharge in the time available before the next pulse started the charging cycle. Consequently, the pulse amplitude would be reduced, and since the power varies as the square of the pulse amplitude measured in volts, the output power would be reduced. From the above, it can be seen that the fall time of the output signal in a conventional capacity loaded cathode follower places a distinct limitation on the repetition rate at which satisfactory operation can be achieved. It can further be noted in curve *b* that the waveform of the output signal is greatly distorted with respect to the square wave input illustrated in curve *a* of Fig. 4.

Curve *c* of Fig. 4 illustrates the output waveform obtained from the embodiment illustrated in Fig. 1. As illustrated, the fall time of the output signal is considerably less, by a factor in the order of 25% than that obtained from the output of a conventional cathode follower.

Curve *d* of Fig. 4 illustrates the waveform of the output signal obtained from the embodiments of the circuit illustrated in Figs. 2 and 3. As illustrated, a reduction in the order of 50% is obtained in the fall time as compared to the fall time of a conventional capacity loaded cathode follower. It may also be observed that the distortion in the output waveform is substantially reduced.

While there have been shown and described and pointed out the fundamental novel features of the invention as applied to a plurality of embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic circuit of the cathode follower type adapted to transfer an input signal to a capacitive load with minimum distortion to the waveform of said signal, comprising, in combination, a vacuum tube having a plurality of electrodes including at least an anode, a cathode and a control grid, an input signal source connected to said control grid, a circuit connected to said anode and said cathode respectively, a transformer having a primary and secondary winding, said primary winding being connected in said anode circuit, said secondary winding being connected in said cathode circuit, said primary and secondary windings of said transformer being so polarized that signals induced in said cathode circuit during transfer of said input pulse vary in the same sense as said input signal, said cathode circuit further including a plurality of unidirectional circuits and means for connecting a capacitive load to said cathode.

2. An electronic circuit of the cathode follower type adapted to transfer an input signal to a capacitive load with minimum distortion to the waveform of said signal comprising, in combination, a vacuum tube having a plurality of electrodes including at least an anode, a cathode and a control grid, circuit means for applying an input signal to said control grid, a circuit associated with said cathode and said anode respectively, a transformer having a primary and secondary winding, said windings being so polarized that the voltage induced in said secondary winding varies in the same sense as said input signal, said circuit associated with said anode having a source of positive supply potential and said primary winding of said transformer, said circuit associated with said cathode including said secondary winding of said transformer, a source of negatve supply potential, terminal means for connecting a capacitive load to said cathode and further including a pair of oppositely poled unidirectional output circuits, each of said undirectional output circuits being connected to an associated potential source of predetermined amplitude whereby said output signal may be maintained within a predetermined amplitude range.

3. An electronic circuit of the cathode follower type adapted to transfer an input signal to a capacitive load with minimum distortion in the wave form of said signal including, in combination, a vacuum tube having an anode, a cathode and a control grid, a first circuit connected to said control grid for applying an input signal thereto, a second circuit connected to said anode, an output circuit connected to said cathode, a transformer having its primary winding connected in said anode circuit and its secondary winding connected in said output circuit, the winding of said transformer being polarized so that the voltage induced in said output circuit varies in the same sense as said input signal, said output circuit also including a resistor connected in series with said secondary winding and a low impedance discharge circuit, said discharge circuit being connected between a point of reference potential and a junction point between the secondary winding of said transformer and said resistor in said output circuit.

4. A circuit of the cathode follower type adapted to transfer an input signal to a capacitive load with minimum distortion in the waveform of said signal including, in combination, a vacuum tube having a cathode, an anode and a control grid, means for applying an input signal to said control grid, a transformer having a primary and secondary winding, a first circuit connected to said anode, said first circuit including the primary winding of said transformer, a second circuit connected to said cathode, said second circuit including the secondary winding of said transformer, the windings of said transformer being so polarized that the voltage induced in said secondary winding varies in the same sense as said input signal and means for connecting said capacitive load to said cathode.

5. An electronic circuit of the cathode follower type adapted to transfer an input signal to a capacitive load with minimum distortion in the waveform of said signal including, in combination, a vacuum tube having an anode, a cathode and a control grid, a first circuit connected to said control grid for applying an input signal thereto, a second circuit connected to said anode, an output circuit connected to said cathode and a transformer having its primary winding connected in said anode circuit and its secondary winding connected in said output circuit, the windings of said transformer being so polarized that the signal induced in said secondary winding varies in the same sense as said input signal.

6. An electronic circuit of the cathode follower type adapted to transfer an input signal to a capacitive load with minimum distortion in the waveform of said signal including, in combination, a vacuum tube having a plurality of electrodes including at least an anode, a cathode and a control grid, a first circuit connected to said control grid for applying an input signal there, a second circuit connected to said anode, a third circuit connected to said cathode and means for inductively coupling said second circuit to said third circuit, said coupling means comprising a transformer having windings in said second and third circuits, said windings being so polarized that the voltage induced in said third circuit varies in the same sense as said input signal, said third circuit including means for connecting a capacitive load to said cathode and further including a discharge circuit adapted to provide a low impedance discharge path for said capacitive load.

References Cited in the file of this patent

UNITED STATES PATENTS

| | | |
|---|---|---|
| 1,783,557 | Bethenod | Dec. 2, 1930 |
| 2,490,043 | Gardner et al. | Dec. 6, 1949 |
| 2,653,236 | Phelan | Sept. 22, 1953 |
| 2,703,382 | Cleary | Mar. 1, 1955 |
| 2,755,333 | Druz | July 17, 1956 |

UNITED STATES PATENT OFFICE

CERTIFICATE OF CORRECTION

Patent No. 2,841,706 July 1, 1958

Robert C. Kuenstner et al.

It is hereby certified that error appears in the printed specification of the above numbered patent requiring correction and that the said Letters Patent should read as corrected below.

Column 2, line 52, for "to", first occurrence, read -- 6 --; column 4, line 74, for "valve" read -- value --; column 6, line 8, for "negatve" read -- negative --.

Signed and sealed this 6th day of January 1959.

(SEAL)

Attest:

KARL H. AXLINE

Attesting Officer

ROBERT C. WATSON

Commissioner of Patents